(12) United States Patent
Wang (10) Patent No.: US 11,655,829 B1
(45) Date of Patent: May 23, 2023

(54) DOWN ROD INSTALLATION STRUCTURE FOR CEILING FAN

(71) Applicant: AIR COOL INDUSTRIAL CO., LTD., Taichung (TW)

(72) Inventor: Cliff Wang, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/561,655

(22) Filed: Dec. 23, 2021

(51) Int. Cl.
*F04D 29/64* (2006.01)
*F16M 13/02* (2006.01)
*F04D 25/08* (2006.01)

(52) U.S. Cl.
CPC ......... *F04D 29/646* (2013.01); *F04D 25/088* (2013.01); *F16M 13/027* (2013.01)

(58) Field of Classification Search
CPC .... F04D 29/646; F04D 25/088; F16M 13/027
See application file for complete search history.

(56) References Cited

U.S. PATENT DOCUMENTS

| | | | | |
|---|---|---|---|---|
| 6,488,439 B1* | 12/2002 | Lackey, Sr. | ........... | F04D 25/088 403/362 |
| 7,887,293 B2* | 2/2011 | Frampton | ............. | F04D 29/668 248/342 |
| 9,605,687 B1* | 3/2017 | Zauhar | ................... | F04D 29/646 |
| 2006/0138295 A1* | 6/2006 | Blateri | .................... | F16B 39/04 248/343 |
| 2008/0286111 A1* | 11/2008 | Richardson | ........... | F04D 29/601 416/244 R |
| 2009/0294620 A1* | 12/2009 | Lin | ........................ | F04D 29/601 248/343 |

* cited by examiner

*Primary Examiner* — Terrell L McKinnon
*Assistant Examiner* — Ding Y Tan
(74) *Attorney, Agent, or Firm* — Pai Patent & Trademark Law Firm; Chao-Chang David Pai (57) ABSTRACT

A down rod installation structure for a ceiling fan has a coupling seat, a down rod, and an elastic member. The down rod is threadedly connected to the coupling seat. The elastic member has a fixed end that is fixed to the coupling seat. The elastic member further has an abutment portion to be engaged in a perforation of the coupling seat and an aperture of the down rod, so that the down rod installation structure invention has the advantages of quick installation and increasing the stability of the ceiling fan.

8 Claims, 8 Drawing Sheets

DOWN ROD INSTALLATION STRUCTURE FOR CEILING FAN

FIELD OF THE INVENTION

The present invention relates to a ceiling fan structure, and more particularly, to a down rod installation structure for a ceiling fan.

BACKGROUND OF THE INVENTION

A conventional ceiling fan fixing structure includes a ceiling fan, a down rod, and a motor. The upper end of the down rod is fixed to the ceiling. The motor is fixed to the lower end of the down rod. In general, the ceiling fan, the down rod and the motor are locked with screws or by a rotary screwing connection, so as to complete the assembly of the ceiling fan, the down rod and the motor for the ceiling fan to be turned smoothly.

However, for the ceiling fan fixing structure using screws, the assembly is not only complicated and cumbersome but also time-consuming. If the ceiling fan is to be moved or replaced, the large number of screws will cause inconvenience in disassembly and assembly. For the ceiling fan fixing structure using a rotary screwing connection, when the ceiling fan runs and vibrates for a long time, it is easy to cause the down rod to loosen. There will be doubts about lack of safety. Accordingly, the inventor of the present invention has devoted himself based on his many years of practical experiences to solve these problems.

SUMMARY OF THE INVENTION

The primary object of the present invention is to provide a down rod installation structure for a ceiling fan, which has the advantages of quick installation and increasing the stability of the ceiling fan.

In order to achieve the above object, a down rod installation structure for a ceiling fan provided by the present invention comprises a coupling seat, a down rod, and an elastic member. The coupling seat has a coupling portion and an annular portion. The coupling portion has an opening. The coupling portion further has a coupling space therein. The opening communicates with the coupling space. The coupling portion has an internal thread on a peripheral wall of the coupling space. A peripheral side of the coupling portion has a perforation. The down rod has a threaded portion corresponding to the internal thread of the coupling portion. The threaded portion of the down rod is in the coupling space and is threadedly connected to the internal thread of the coupling portion. The threaded portion of the down rod has an aperture corresponding to the perforation of the coupling portion. The elastic member includes an elastic portion and an abutment portion connected to the elastic portion. The elastic portion is disposed outside the coupling portion. The elastic portion has a fixed end and a free end connected to the fixed end. The fixed end of the elastic portion is fixed to the coupling seat. The abutment portion is connected to the free end of the elastic portion. The abutment portion corresponds to the perforation of the coupling seat and the aperture of the down rod. One side of the abutment portion, opposite to the elastic portion, has an inclined portion corresponding to the threaded portion of the down rod. The inclined portion has a first end and a second end. The inclined portion is inclined from the first end to the second end. The first end is disposed adjacent to the elastic portion and the opening. The second end is disposed away from the elastic portion and the opening. When the elastic portion is in a normal state, the free end of the elastic portion is in a normal statue position adjacent to an outer wall of the coupling portion and the perforation, and the abutment portion is located in the coupling space and the perforation. When the abutment portion is pushed by the down rod to elastically displace the abutment portion and the free end of the elastic portion to be in a stressed state, the free end of the elastic portion is in a stressed state position away from the outer wall of the coupling portion and the perforation, and the abutment portion is moved away from the coupling space. The free end of the elastic portion is displaceable between the normal state position and the stressed state position. When the down rod is coupled to the coupling portion, the free end of the elastic portion returns to the normal state position, and the abutment portion is engaged in the perforation of the coupling portion and the aperture of the down rod.

In the down rod installation structure for a ceiling fan provided by the present invention, the fixed end of the elastic portion is fixed to the coupling seat. The abutment portion is connected to the free end of the elastic portion. When the abutment portion is pushed by the down rod to elastically displace the abutment portion and the free end of the elastic portion to be in a stressed state, the free end of the elastic portion is in a stressed state position away from the outer wall of the coupling portion and the perforation, and the abutment portion is moved away from the coupling space. When the down rod is coupled to the coupling portion, the abutment portion is engaged in the perforation of the coupling portion and the aperture of the down rod. The down rod installation structure has the advantages of quick installation and increasing the stability of the ceiling fan.

DETAILED DESCRIPTION OF THE PREFERRED EMBODIMENTS

Embodiments of the present invention will now be described, by way of example only, with reference to the accompanying drawings.

Figure 1:
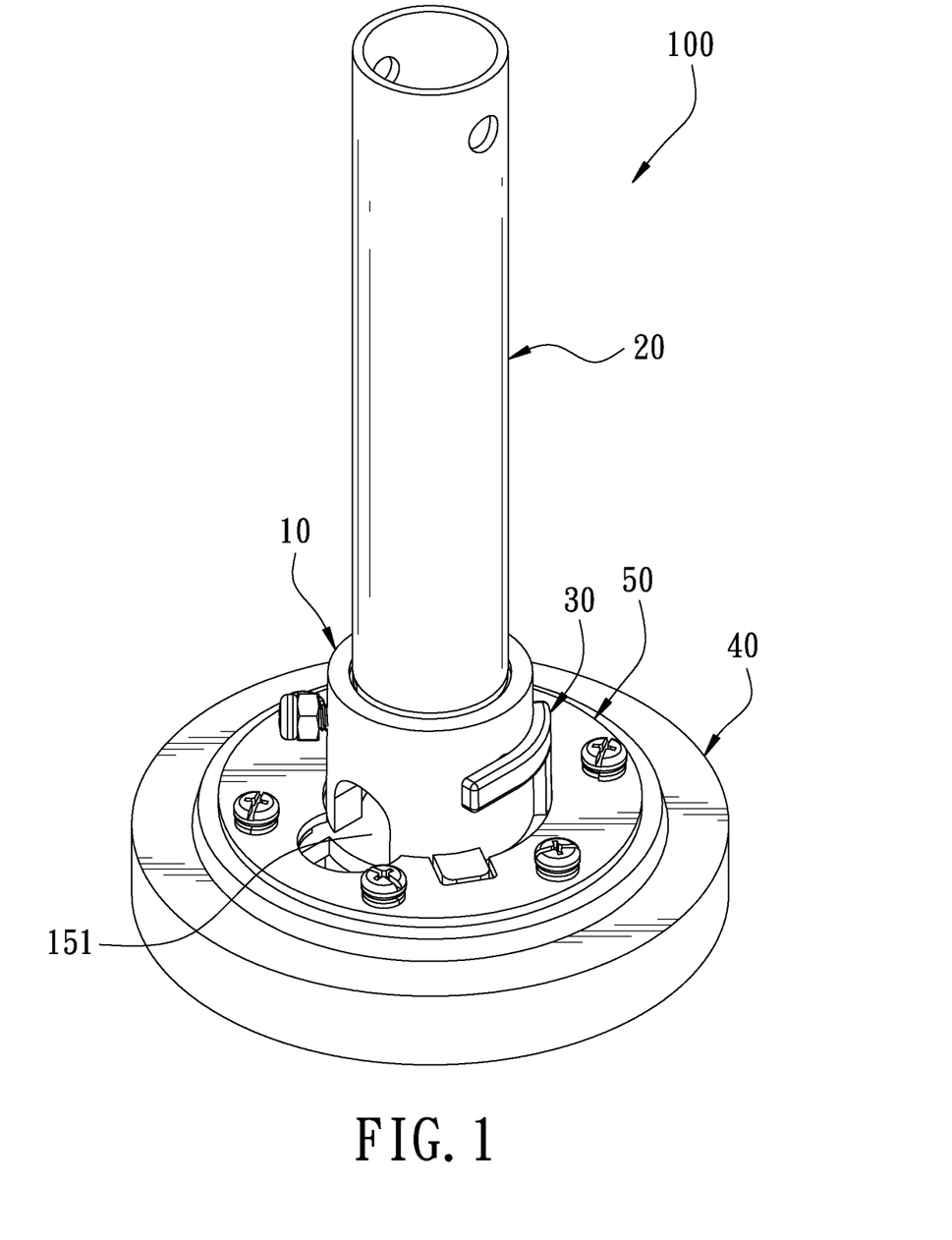
FIG. 1 is a perspective view of a preferred embodiment of the present invention.
Figure 2:
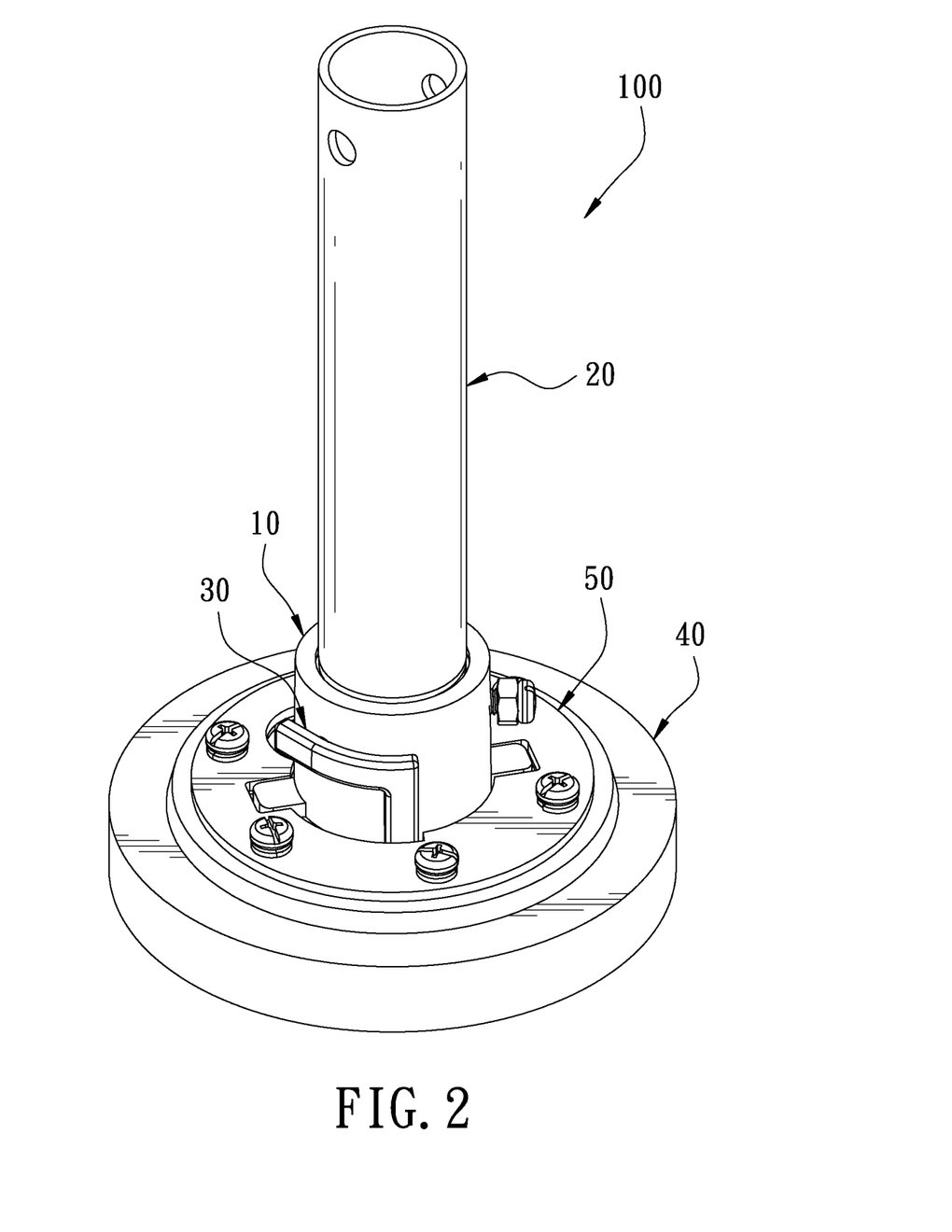
FIG. 2 is another perspective view of the preferred embodiment of the present invention.
Figure 3:
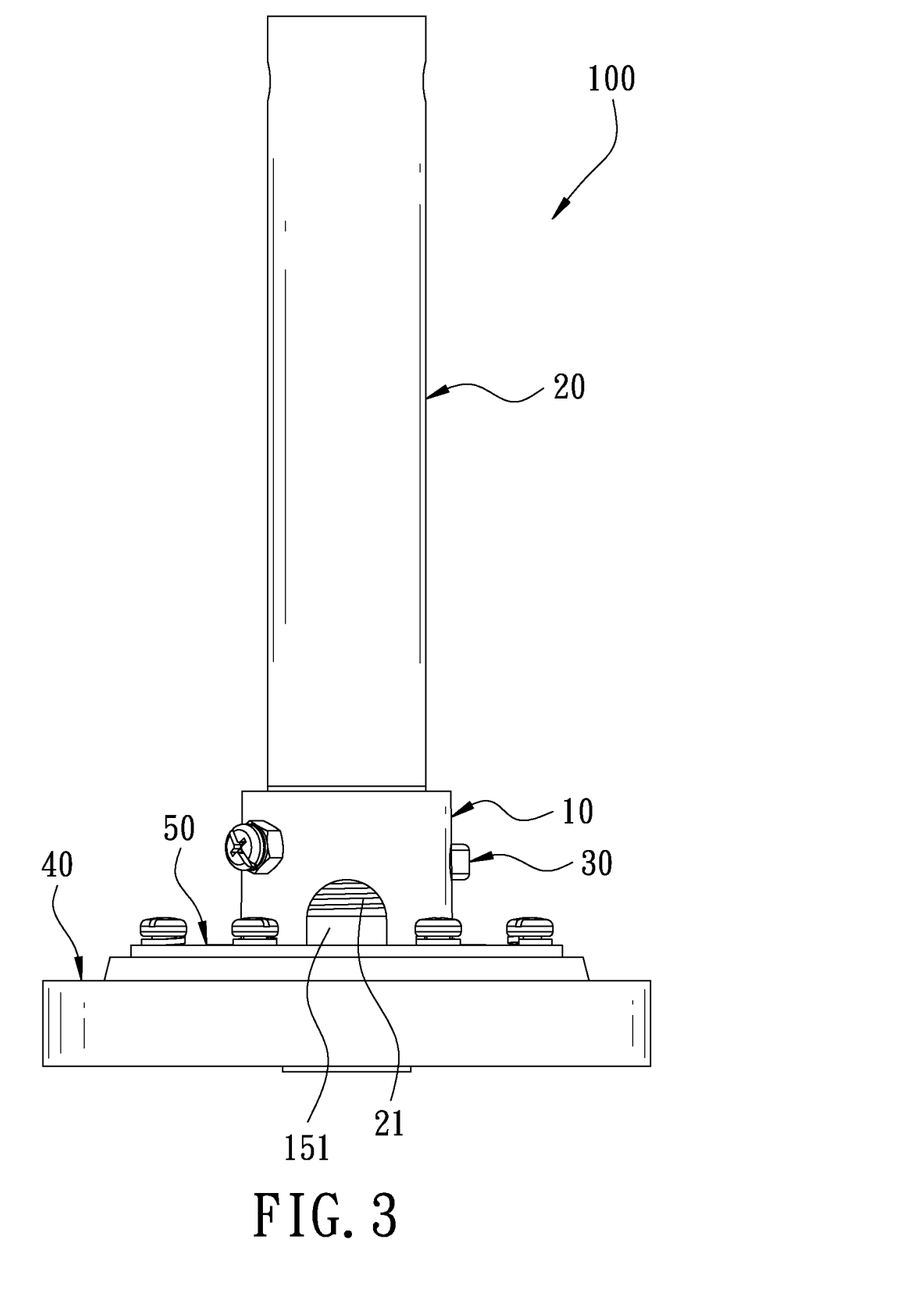
FIG. 3 is a side view of the preferred embodiment of the present invention.

FIG. 1 is a perspective view of a preferred embodiment of the present invention. FIG. 2 is another perspective view of the preferred embodiment of the present invention. FIG. 3 is a side view of the preferred embodiment of the present invention. The present invention discloses a down rod installation structure 100 for a ceiling fan. The down rod installation structure 100 comprises a coupling seat 10, a down rod 20, an elastic member 30, a retaining disc 40, and a retaining plate 50.

Figure 4:
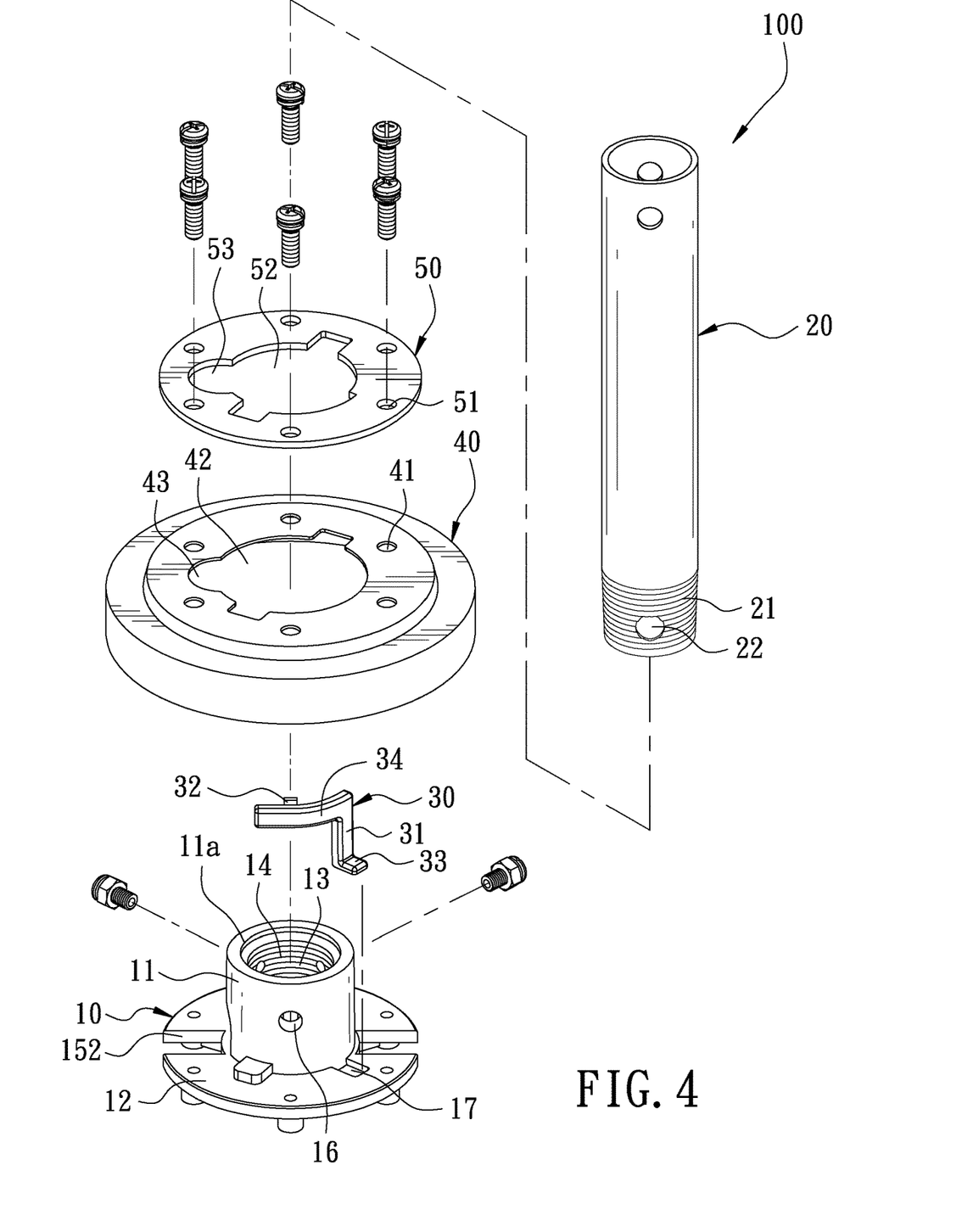
FIG. 4 is an exploded view of the preferred embodiment of the present invention.
Figure 5:
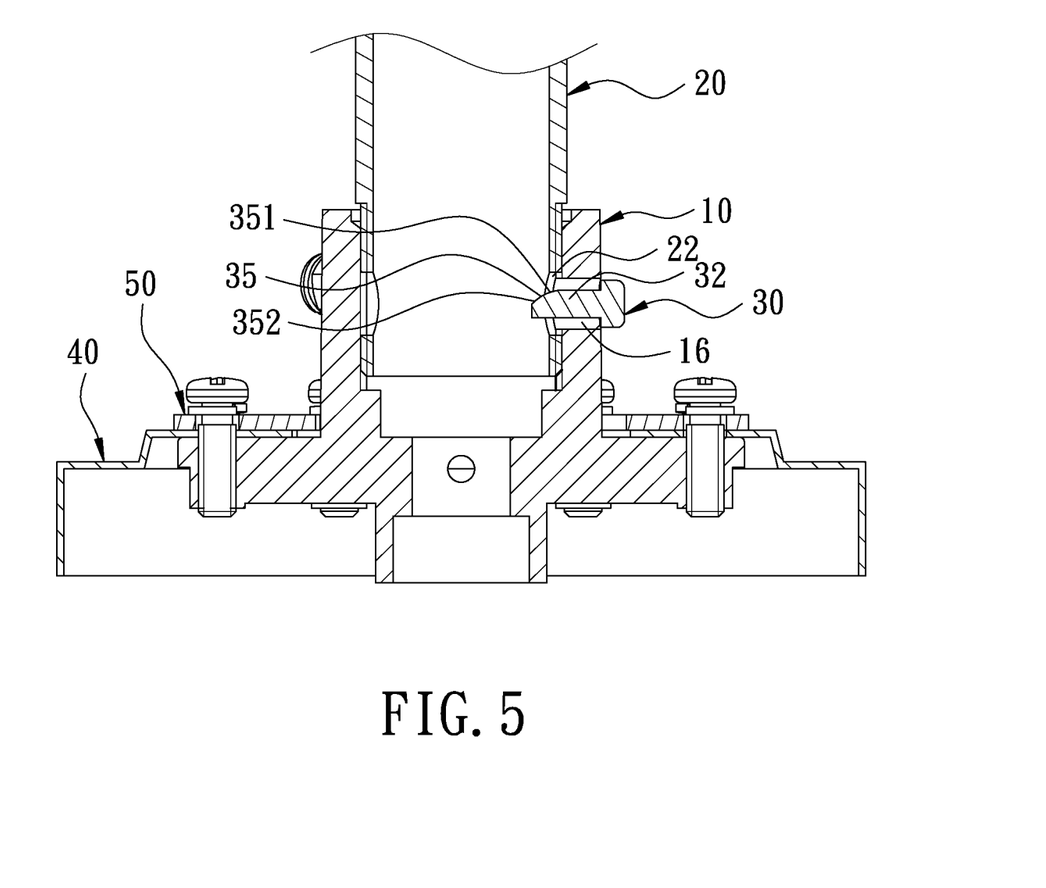
FIG. 5 is a cross-sectional view of the preferred embodiment of the present invention.

FIG. 4 is an exploded view of the preferred embodiment of the present invention. FIG. 5 is a cross-sectional view of the preferred embodiment of the present invention. The coupling seat 10 is fixed to a fixing structure of a motor and a ceiling fan or fixed to a ceiling. The coupling seat 10 has a coupling portion 11 and an annular portion 12. The coupling portion 11 has an opening 11a. The coupling portion 11 further has a coupling space 13 therein. The opening 11a communicates with the coupling space 13. The coupling portion 11 has an internal thread 14 on the peripheral wall of the coupling space 13. The peripheral side of the coupling portion 11 has a through hole 151 for insertion of an electric wire. The peripheral side of the coupling portion 11 has a perforation 16. The annular portion 12 is connected to the bottom edge of the coupling portion 11. One side of the annular portion 12, close to the perforation 16, is recessed with an engaging groove 17. The annular portion 12 has a notch 152 for insertion of the electric wire.

The down rod 20 has a threaded portion 21 corresponding to the internal thread 14 of the coupling portion 11. The threaded portion 21 of the down rod 20 is in the coupling space 13 and is threadedly connected to the internal thread 14 of the coupling portion 11. The threaded portion 21 of the down rod 20 has an aperture 22 corresponding to the perforation 16 of the coupling portion 11.

The elastic member 30 includes an elastic portion 31 and an abutment portion 32 connected to the elastic portion 31. The elastic portion 31 is disposed outside the coupling portion 11. The elastic portion 31 has a fixed end 33 and a free end 34 connected to the fixed end 33. The fixed end 33 and the free end 34 of the elastic portion 31 are not parallel to each other. The fixed end 33 and the free end 34 of the elastic portion 31 are perpendicular to each other. The fixed end 33 of the elastic portion 31 is fixed to the engaging groove 17 of the coupling seat 10. The free end 34 of the elastic portion 31 is adjacent to the outer wall of the coupling portion 11. The abutment portion 32 is connected to the free end 34 of the elastic portion 31. The abutment portion 32 corresponds to the perforation 16 of the coupling seat 10 and the aperture 22 of the down rod 20. One side of the abutment portion 32, opposite to the elastic portion 31, has an inclined portion 35 corresponding to the threaded portion 21 of the down rod 20. The inclined portion 35 may be an inclined surface or a curved surface, etc. The inclined portion 35 has a first end 351 and a second end 352. The inclined portion 35 is inclined from the first end 351 to the second end 352. The first end 351 is disposed adjacent to the elastic portion 31 and the opening 11a. The second end 352 is disposed away from the elastic portion 31 and the opening 11a. When the elastic portion 31 is in a normal state, the free end 34 of the elastic portion 31 is in a normal statue position adjacent to the outer wall of the coupling portion 11 and the perforation 16, and the abutment portion 32 is located in the coupling space 13 and the perforation 16. When the abutment portion 32 is pushed by the down rod 20 to elastically displace the abutment portion 32 and the free end 34 of the elastic portion 31 to be in a stressed state, the free end 34 of the elastic portion 31 is in a stressed state position away from the outer wall of the coupling portion 11 and the perforation 16, and the abutment portion 32 is moved away from the coupling space 13. The free end 34 of the elastic portion 31 is displaceable between the normal state position and the stressed state position. When the down rod 20 is coupled to the coupling portion 11, the free end 34 of the elastic portion 31 returns to the normal state position, and the abutment portion 32 is engaged in the perforation 16 of the coupling portion 11 and the aperture 22 of the down rod 20.

The retaining disc 40 is locked to the top of the coupling seat 10. The retaining disc 40 is located between the fixed end 33 and the abutment portion 32 of the elastic member 31. The retaining disc 40 is adjacent to the fixed end 33 of the elastic member 30. The retaining disc 40 covers the fixed end 33 of the elastic portion 31 and the engaging groove 17, so that the fixed end 33 of the elastic portion 31 is firmly disposed in the engaging groove 17. The retaining disc 40 has a first retaining portion 41. The first retaining portion 41 may be composed of screw holes. The retaining disc 40 has a first axial hole 42 for insertion of the elastic member 30, the down rod 20 and the coupling portion 11 of the coupling seat 10. The elastic member 30 is secured between the inner wall of the first axial hole 42 and the coupling portion 11. The retaining disc 40 further has a first hole 43 extending from the first axial hole 42 for insertion of the electric wire.

The retaining plate 50 is locked to the top of the retaining disc 40. The retaining plate 50 is located between the fixed end 33 and the abutment portion 32 of the elastic member 30. The retaining plate 50 is adjacent to the fixed end 33 of the elastic member 30. The retaining plate 50 has a second retaining portion 51. The second retaining portion 51 may be composed of screw holes. The retaining plate 50 is locked to the retaining disc 40 with a screw screwed to the first retaining portion 41. The retaining plate 50 has a second axial hole 52 for insertion of the elastic member 30, the down rod 20 and the coupling portion 11 of the coupling seat 10. The elastic member 30 is secured between the inner wall of the second axial hole 52 and the coupling portion 11. The retaining plate 50 further has a second hole 53 extending from the second axial hole 52 for insertion of the electric wire.

Figure 6:
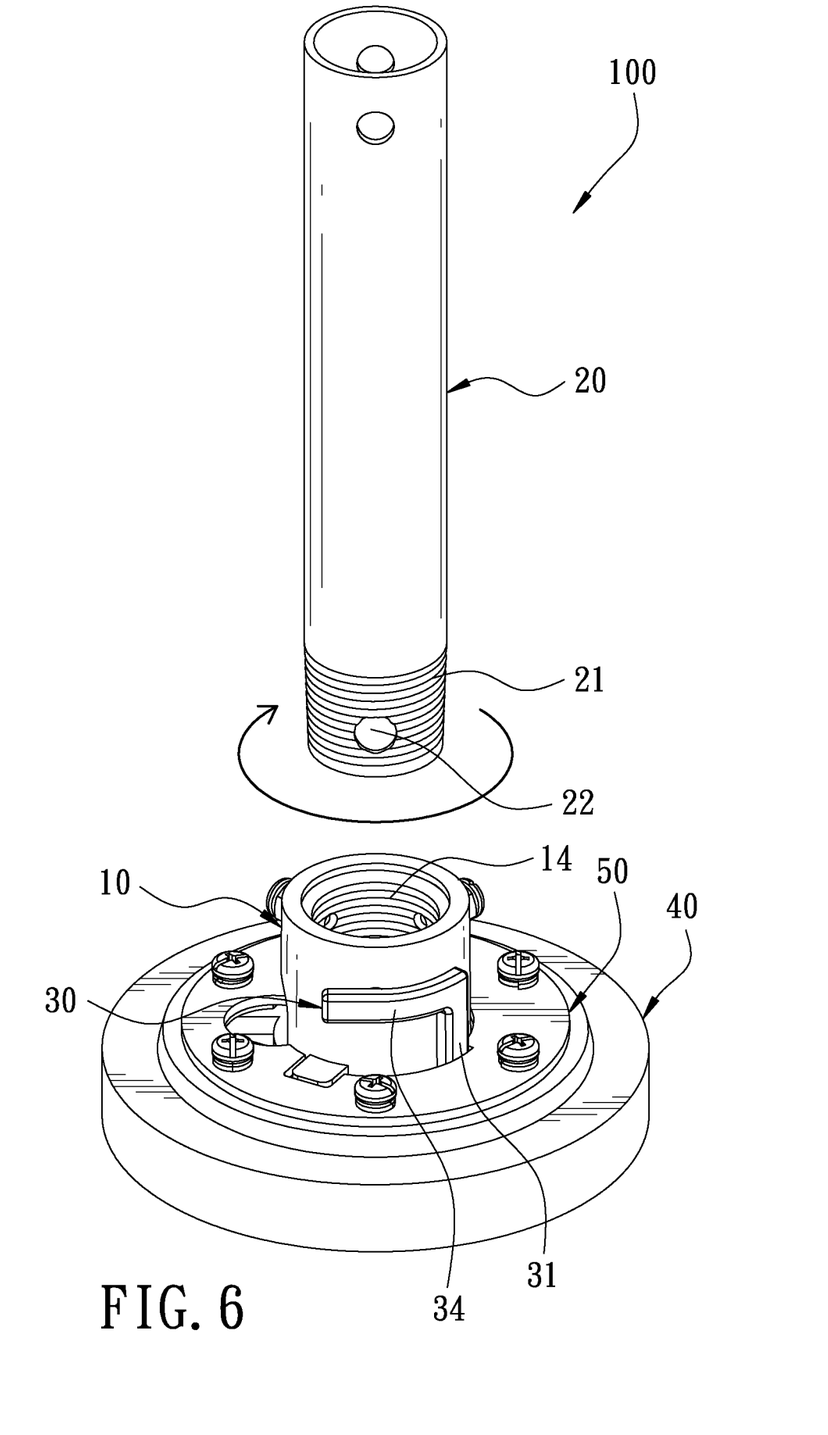
FIG. 6 is a schematic view illustrating the assembly of the preferred embodiment of the present invention.
Figure 7:
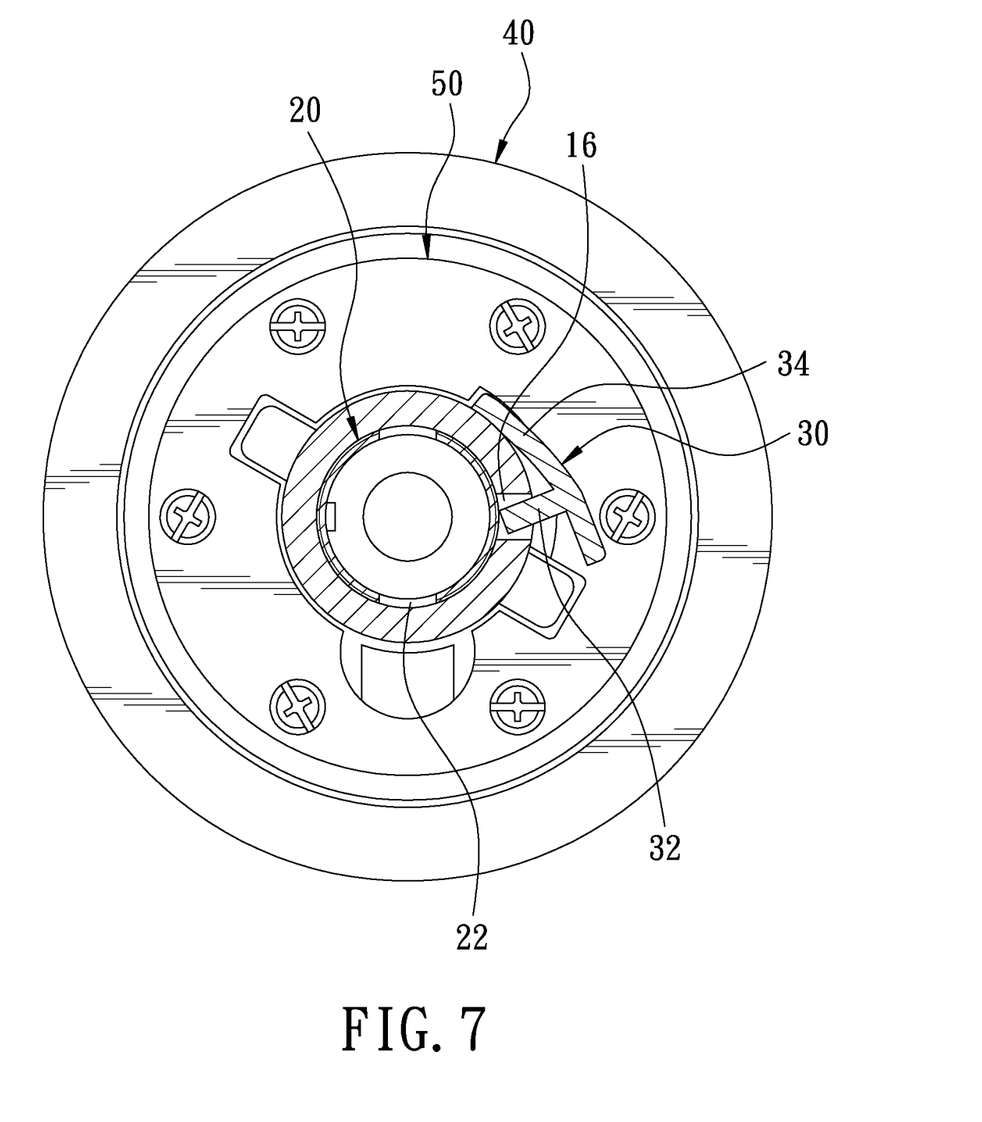
FIG. 7 is a top cross-sectional view of the preferred embodiment of the present invention.
Figure 8:
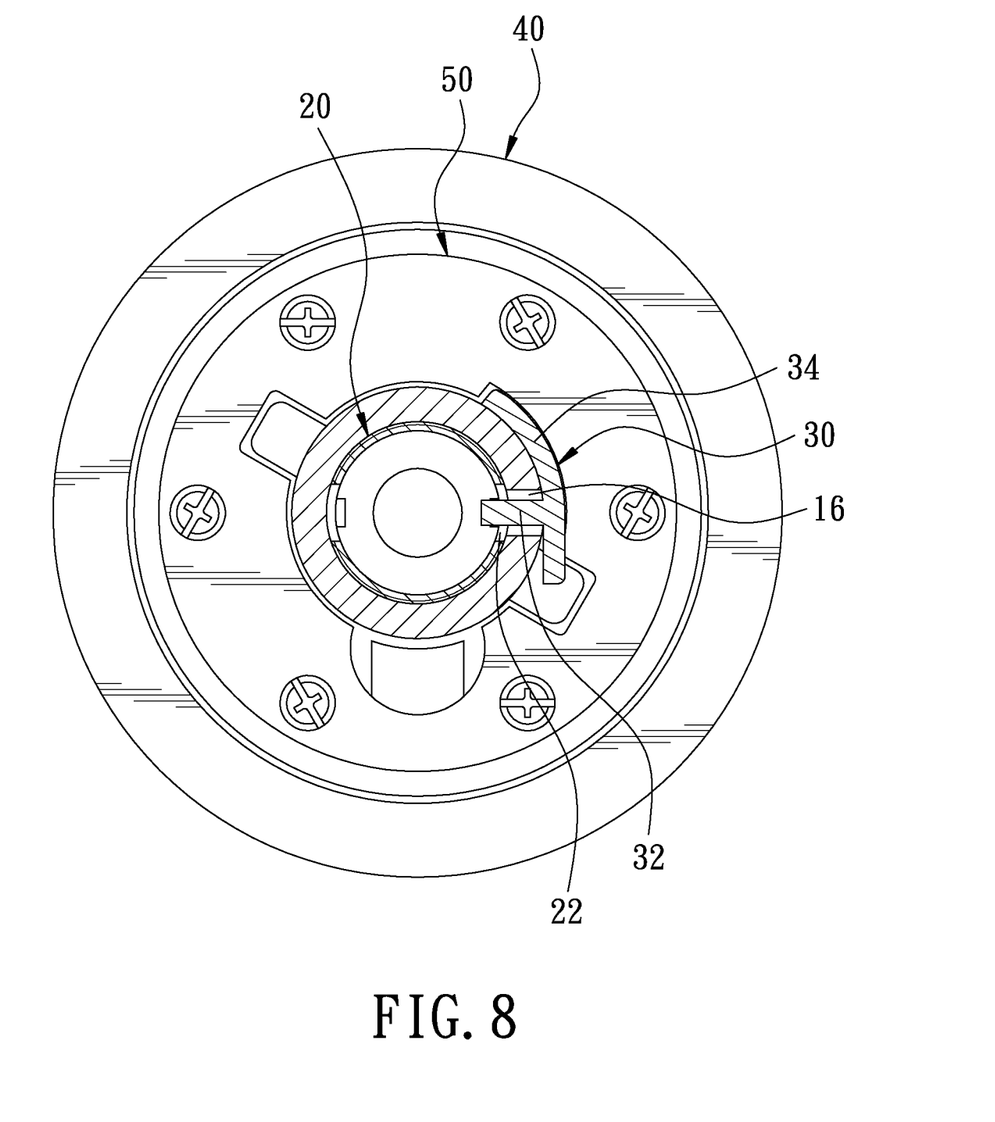
FIG. 8 is another top cross-sectional view of the preferred embodiment of the present invention.

FIG. 6 is a schematic view illustrating the assembly of the preferred embodiment of the present invention. FIG. 7 and FIG. 8 are top cross-sectional views of the preferred embodiment of the present invention. When the elastic portion 31 of the elastic member 30 is in the normal state, the free end 34 of the elastic portion 31 is in the normal state position adjacent to the outer wall of the coupling portion 11 and the perforation 16, and the abutment portion 32 is located in the coupling space 13 and the perforation 16. When the down rod installation structure 100 is to be assembled, the down rod 20 is placed in the coupling portion 11 of the coupling seat 10, and the threaded portion 21 of the down rod 20 is in the coupling space 13 and is threadedly connected to the internal thread 14 of the coupling portion 11. At this time, the down rod 20 is rotated in the direction of the perforation 16 of the coupling portion 11. When the abutment portion 32 of the elastic member 30 is pushed by the down rod 20 to elastically displace the abutment portion 32 and the free end 34 of the elastic portion 31 to be in the stressed state, the free end 34 of the elastic portion 31 is in the stressed state position away from the outer wall of the coupling portion 11 and the perforation 16, and the abutment portion 32 is moved away from the coupling space 13. The free end 34 of the elastic portion 31 is displaceable between the normal state position and the stressed state position. When the down rod 20 is coupled to the coupling portion 11, the free end 34 of the elastic portion 31 returns to the normal state position and the abutment portion 32 is engaged in the perforation 16 of the coupling portion 11 and the aperture 22 of the down rod 20, such that the down rod 20 is locked and fixed to the coupling seat 10, so as to quickly complete the assembly of the down rod installation structure 100.

It is worth mentioning that the fixed end 33 of the elastic portion 31 is fixed to the engaging groove 17 of the coupling portion 11. The free end 34 of the elastic portion 31 is adjacent to the outer wall of the coupling portion 11. The retaining disc 40 covers the fixed end 33 of the elastic portion 31 and the engaging groove 17. The abutment portion 32 is inserted in the perforation 16 of the coupling seat 10 and the aperture 22 of the down rod 20. The elastic member 30 is further retained by the retaining disc 40 and the retaining plate 50 to prevent the elastic member 30 from being separated from the coupling seat 10, thereby preventing the down rod 20 from being separated from the coupling seat 10. Thus, the down rod installation structure 100 of the ceiling fan has the advantages of improving the stability of the ceiling fan and increasing the safety.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A down rod installation structure for a ceiling fan, comprising:
    a coupling seat, having a coupling portion and an annular portion, the coupling portion having an opening, the coupling portion further having a coupling space therein, the opening communicating with the coupling space, the coupling portion having an internal thread on a peripheral wall of the coupling space, a peripheral side of the coupling portion having a perforation;
    a down rod, having a threaded portion corresponding to the internal thread of the coupling portion, the threaded portion of the down rod being in the coupling space and being threadedly connected to the internal thread of the coupling portion, the threaded portion of the down rod having an aperture corresponding to the perforation of the coupling portion;
    an elastic member, including an elastic portion and an abutment portion connected to the elastic portion, the elastic portion being disposed outside the coupling portion, the elastic portion having a fixed end and a free end connected to the fixed end, the fixed end of the elastic portion being fixed to the coupling seat, the abutment portion being connected to the free end of the elastic portion, the abutment portion corresponding to the perforation of the coupling seat and the aperture of the down rod, one side of the abutment portion, opposite to the elastic portion, having an inclined portion corresponding to the threaded portion of the down rod, the inclined portion having a first end and a second end, the inclined portion being inclined from the first end to the second end, the first end being disposed adjacent to the elastic portion and the opening, the second end being disposed away from the elastic portion and the opening;
    wherein when the elastic portion is in a normal state, the free end of the elastic portion is in a normal statue position adjacent to an outer wall of the coupling portion and the perforation, and the abutment portion is located in the coupling space and the perforation; when the abutment portion is pushed by the down rod to elastically displace the abutment portion and the free end of the elastic portion to be in a stressed state, the free end of the elastic portion is in a stressed state position away from the outer wall of the coupling portion and the perforation, and the abutment portion is moved away from the coupling space, the free end of the elastic portion is displaceable between the normal state position and the stressed state position; when the down rod is coupled to the coupling portion, the free end of the elastic portion returns to the normal state position, and the abutment portion is engaged in the perforation of the coupling portion and the aperture of the down rod.

2. The down rod installation structure as claimed in claim 1, further comprising a retaining disc locked to a top of the coupling seat, wherein one side of the annular portion, close to the perforation, is recessed with an engaging groove, the fixed end of the elastic portion is fixed to the engaging groove of the coupling seat, and the retaining disc covers the fixed end of the elastic portion and the engaging groove so that the fixed end of the elastic portion is firmly disposed in the engaging groove.

3. The down rod installation structure as claimed in claim 1, wherein the peripheral side of the coupling portion has a through hole for insertion of an electric wire.

4. The down rod installation structure as claimed in claim 2, wherein the retaining disc has a first axial hole for insertion of the elastic member, the down rod and the coupling portion of the coupling seat, the elastic member is secured between an inner wall of the first axial hole and the coupling portion, the retaining disc is located between the fixed end and the abutment portion of the elastic member, and the retaining disc is adjacent to the fixed end of the elastic member.

5. The down rod installation structure as claimed in claim 4, further comprising a retaining plate, the retaining plate being locked to a top of the retaining disc, the retaining plate having a second axial hole for insertion of the elastic member, the down rod and the coupling portion of the coupling seat, the elastic member being secured between an inner wall of the second axial hole and the coupling portion, the retaining plate being located between the fixed end and the abutment portion of the elastic member, the retaining plate being adjacent to the fixed end of the elastic member.

6. The down rod installation structure as claimed in claim 5, wherein the peripheral side of the coupling portion has a through hole for insertion of an electric wire, the annular portion has a notch for insertion of the electric wire, the retaining disc further has a first hole extending from the first axial hole for insertion of the electric wire, the retaining plate further has a second hole extending from the second axial hole for insertion of the electric wire, the annular portion is connected to a bottom edge of the coupling portion, and the free end of the elastic portion is adjacent to the outer wall of the coupling portion.

7. The down rod installation structure as claimed in claim 1, wherein the fixed end and the free end of the elastic portion are not parallel to each other.

8. The down rod installation structure as claimed in claim 7, wherein the fixed end and the free end of the elastic portion are perpendicular to each other.

* * * * *